United States Patent [19]

Kakuhashi et al.

[11] Patent Number: 4,540,463
[45] Date of Patent: Sep. 10, 1985

[54] RESISTOR SHEET INPUT TABLET FOR THE INPUT OF TWO-DIMENSIONAL PATTERNS AND METHOD FOR PRODUCTION OF PARTS FOR SAME

[75] Inventors: Takeshi Kakuhashi; Hiroshi Tahara; Yoshihisa Mori, all of Osaka, Japan

[73] Assignee: Nitto Electric Industrial Co., Ltd., Osaka, Japan

[21] Appl. No.: 668,434

[22] Filed: Nov. 5, 1984

Related U.S. Application Data

[62] Division of Ser. No. 515,228, Jul. 19, 1983, Pat. No. 4,517,546.

[30] Foreign Application Priority Data

Jul. 19, 1982 [JP] Japan .................... 57-126069

[51] Int. Cl.³ .................... C23F 1/02; B44C 1/22; C03C 15/00; C03C 25/06
[52] U.S. Cl. .................... 156/630; 29/620; 156/634; 156/656; 156/659.1; 156/902; 427/102; 427/103
[58] Field of Search ............ 156/630, 634, 656, 659.1, 156/901, 902; 29/610 R, 620, 621, 846; 338/308, 314; 427/101–103

[56] References Cited

U.S. PATENT DOCUMENTS

| | | | |
|---|---|---|---|
| 2,662,957 | 12/1953 | Eister | 29/620 X |
| 3,386,011 | 5/1968 | Murray et al. | 29/620 X |
| 3,761,860 | 9/1973 | Ogasawara et al. | 338/309 X |
| 4,283,248 | 8/1981 | Kakuhashi et al. | 156/656 X |
| 4,396,900 | 8/1983 | Hall | 338/309 |

*Primary Examiner*—William A. Powell
*Attorney, Agent, or Firm*—Sughrue, Mion, Zinn, Macpeak & Seas

[57] ABSTRACT

A resistor sheet input tablet comprising two rectangular resistor sheets each provided at two opposite edges thereof with electrodes, the rectangular resistor sheets being superposed such that the electrodes on one of the resistor sheets lie perpendicularly to those on the other resistor sheets, wherein the resistor sheets have a two resistor layer construction comprising (a) a main resistor layer consisting of a thin metal film deposited thereon which in turn is bonded to (b) an electrically insulating layer and (c) a protective resistor layer formed on the surface of the main resistor layer.

5 Claims, 8 Drawing Figures

4,540,463

RESISTOR SHEET INPUT TABLET FOR THE INPUT OF TWO-DIMENSIONAL PATTERNS AND METHOD FOR PRODUCTION OF PARTS FOR SAME

This is a division of application Ser. No. 515,228, filed 7/19/83, now U.S. Pat. No. 4,517,546.

FIELD OF THE INVENTION

The present invention relates to an input tablet for the input of two-dimensional patterns such as picture images or words. More particularly, the present invention relates to a resistor sheet input tablet and to a method for production of parts for said resistor sheet input tablet.

BACKGROUND OF THE INVENTION

Input tablets are classified by their operating principle. Examples of input tablets include: resistor sheet input tablets, conductive sheet input tablets, optical scanning input tablets, surface-wave transmission time detecting input tablets, and strain gauge input tablets.

Resistor sheet input tablets, among other types of input tablets, utilize the principle that the positional coordinates of the points of input on the resistor sheet are detectable from the corresponding ratios of the electric current or the electric potential. Thus, they are simple in structure and have a low cost of production. However, for successful use of resistor sheet input tablets, there must be a uniform distribution of the fixed sheet resistivity throughout the entire area of the resistor sheets.

The resistor sheets which are available on the market or are still under development are produced by a method which involves applying, to one side of a synthetic resin film, a dispersion of a conductive material such as carbon powder mixed with a thermosetting synthetic resin, i.e., carbon paste (or carbon ink) by screen printing or by the use of a roller. However, these resistor sheets lack the required uniform distribution of the conductive particles in the paste and the required uniform thickness of the coat applied to the substrate film. Thus, these resistor sheets fail to provide an exact correlation between the positional coordinates of the points of input and the corresponding ratios of the electric current or the electric potential. Hence, these resistor sheets are disadvantageous in that the reproduced images are inevitably distorted.

Japanese Patent Application (OPI) No. 97137/81 (the term "OPI" as used herein refers to a "published unexamined Japanese patent application"), which teaches a solution to the above-described problem, discloses a resistor sheet comprising several oblong strips which are insulated from one another and arranged side by side to complete one sheet. However, this resistor sheet is disadvantageous in that it fails to receive delivered information on the boundaries of the adjoining oblong strips, it has a complicated structure and it is expensive to manufacture.

Japanese Patent Application (OPI) No. 51425/79 discloses an electric resistor fabric woven in the form of a sheet using electrically insulated yarns and electrically resistant wire as warps and wefts, respectively. However, this electric resistor fabric has not yet been accepted for actual use because it is disadvantageous in that it only offers limited resolution, does not solve the problem of the susceptibility of the meshes to deformation and requires unusually high pressure in operation.

SUMMARY OF THE INVENTION

An object of the present invention is to eliminate the various disadvantages of conventional resistor sheet input tablets described above. More specifically, an object of the present invention is to provide low cost resistor sheet input tablets.

Another object of the present invention is to provide resistor sheet input tablets capable of detecting the points of input accurately based on the corresponding ratios of the electric potential or the electric current.

A further object of the present invention is to provide a method for the production of resistor sheet input tablets.

The above objects have been met by the input tablet of the present invention which comprises two rectangular resistor sheets, each provided with electrodes at two opposite edges thereof, wherein one sheet is superposed on the other sheet such that the electrodes on one resistor sheet lie perpendicularly to those on the other resistor sheet, and wherein the resistor sheets each have a two resistor layer construction comprising (a) a main resistor layer consisting of a thin electrically conductive metal film deposited thereon which in turn is bonded to (b) an electrically inculating layer and (c) a protective resistor layer formed on the surface of the main resistor layer.

DETAILED DESCRIPTION OF THE INVENTION

Figure 1:
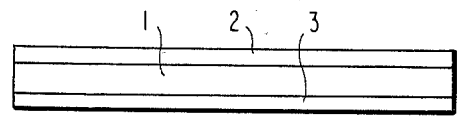
FIG. 1, FIG. 2, FIG. 3, FIG. 4 and FIG. 5 illustrate the process to be followed in the production of a preferred embodiment of the invention.

When the resistor sheet input tablets of the present invention are formed by preparing two rectangular resistor sheets each provided with electrodes at two opposite edges thereof and these resistor sheets are deposited on either side of an elastic pressure-sensitive conductive sheet; for example, a pressure-sensitive conductive sheet having a thickness of about 0.3 to 2 mm and comprising nickel particles or graphite particles incorporated in silicone rubber; such that the electrodes on one side of the resistor sheets lie perpendicularly to those on the other resistor sheet, it is possible to receive the delivered information as input with a softened tough.

The resistor sheets are elements of the resistor sheet input tablets of the present invention. Each sheet has a two resistor layer construction which comprises a main resistor layer formed on an electrically insulating layer and a protective resistor layer formed on the main resistor layer. It is desirable to form the resistor sheet input tablet such that the protective resistor layers used therein also cover the inside edges of the opposite electrodes on the resistor sheets.

The production of the resistor sheets for the input tablets of the present invention is preferably accomplished by the following steps: (1) depositing on one side of a highly electrically conductive plate, a thin metal film which makes up a main resistor layer; (2) bonding an electrically insulating layer to the surface of the thin metal film; (3) making the opposite edges of the conductive plate which are reserved for the formation of electrodes thereon: (4) simultaneously etching out the conductive plate, thereby exposing the thin metal film, and forming electrodes of the resistor sheet at the masked edges; and (5) coating the exposed surface of the thin metal film on the resistor sheet with a protective resistor layer.

The highly electrically conductive plate may be made of various highly electrically conductive materials. Examples of such highly electically conductive materials include: (a) copper foil, (b) aluminum foil, or (c) nickel foil. It is preferred that the highly electrically conductive plates have a thickness of about 5 to 70 $\mu$m.

The thin metal film may be made of (a) a nickel alloy such as a nickel-tin alloy, a nickel-chromium alloy, or a nickel-phosphorus alloy, or (b) tantalum nitride. It is preferred that the thin metal film have a sheet resistivity of 5 to 5,000 ohms per square. In order to obtain a sheet resistivity of this value, the thin metal film preferably has a thickness of about 0.01 to 0.7 $\mu$m.

The deposition of the thin metal film on one side of the highly electrically conductive plate can be advantageously accomplished by various plating methods. Examples of such plating methods include: (a) electroplating and (b) non-electrolytic plating. The electroplating method, among other methods, is particularly desirable since (1) it imparts excellent electrical properties; (2) provides a uniform distribution of a fixed resistance value; and (3) facilitates in the preparation of large sheets.

Any of the other various known plating methods such as (a) vacuum deposition, (b) cathode sputtering, (c) CVD (chemical vapor deposition), and (d) ion plating can be employed in the formation of the thin metal film.

The material for the electrically insulating layer is selected depending on whether the insulating layer is disposed on the upper side or lower side of the resulting resistor sheet input tablet. The insulating layer incorporated in the upper side must be made of a flexible film and be capable of withstanding the concentrated pressure of an input stylus. Examples of such films satisfying this requirement include: (a) polyester films, (b) polyvinyl chloride films, (c) polyimide films, (d) polyethylene films, (e) polyamide paper films (e.g., a product of Du Pont, marketed under the trademark "Normex") and (f) glass cloth films impregnated with an epoxy resin. It is preferred that these films have a thickness of about 25 to 150 $\mu$m.

Any of the above films, except for the glass cloth film impregnated with epoxy resin, can be bonded to the thin metal film by means of an adhesive agent such as an epoxy type or an acrylic type.

The insulating layer incorporated at the lower side of the resulting resistor sheet input tablet must be a film possessing rigidity rather than flexibility. Examples of such films satisfying this requirement include: (a) an epoxy-glass laminate plate and (b) an epoxy-paper laminate plate. A resistor sheet using a flexible film as its support may be used when bonded to a rigid plate if desired.

In the method of the present invention, the removal of the highly conductive plate, except for the edge portions thereof which are reserved for subsequent formation of electrodes thereon, can be effected by etching. The etching solutions to be used for this removal contain an agent which does not substantially dissolve out the thin metal film which makes up the main resistor layer.

As a result of the above-described process, electrodes are formed on the resistor sheet. Next, the exposed main resistor layer is coated with a protective resistor layer. It is preferable that the protective resistor layer be deposited so as to also cover the inside edges of the electrodes.

The protective resistor layer can be produced by curing a paste (or ink) comprising (a) carbon powder or metal powder such as silver powder or nickel powder and (b) a synthetic resin. The protective resistor layer is preferably resistant to wear, possesses a sheet resistivity of about 50 to 50,000 ohms per square and has a thickness of 5 to 30 $\mu$m. The value of the sheet resistivity possessed by the protective resistor layer is preferably at least 5 times, and more preferably 5 to 200 times, the sheet resistivity of the main resistor layer.

Other objects and characteristic features of the present invention will become apparent to those skilled in the art from the following description of a preferred embodiment of the present invention with reference to the drawings.

One side of copper foil 1, which will make up the conductive layer (electrode), is coated with masking adhesive sheet 2. Then, by electroplating the other side of copper foil 1 with a tin-nickel alloy, main resistor layer 3, having a prescribed thickness, is formed as shown in FIG. 1. Main resistor layer 3 having the lowest desirable film thickness of about 0.01 to 0.02 $\mu$m can be obtained because the copper foil possesses a high degree of surface smoothness.

Figure 2:
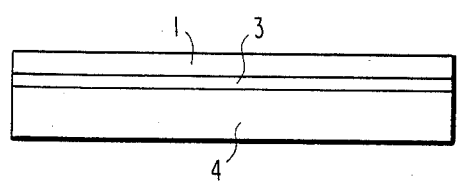

Next, masking adhesive sheet 2 is peeled off and insulating layer 4 is bonded to the surface of main resistor layer 3 as shown in FIG. 2. Note, insulating layer 4 is made of a flexible sheet. For a resistor sheet to be used in the lowermost layer, a rigid substrate may be used.

Figure 3:
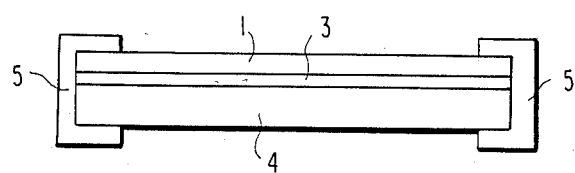
Figure 4:
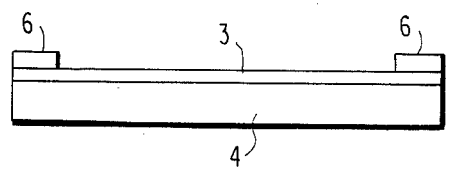

Then, masking tape 5 is applied to the opposite two edge portions of the three-layer laminate obtained as described above, as shown in FIG. 3.

Next, the exposed portion of copper foil 1 is etched out with a copper-etching liquid. As a result, a resistor sheet is formed having electrodes 6 on each of the opposite edges of main resistor layer 3.

Figure 5:
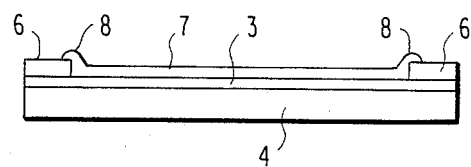

Protective resistor layer 7 is formed by applying a pasty raw material thereof to the surface of main resistor layer 3 by screen printing. In this manner, protective resistor layer 7 not only completely covers the entire surface of main resistor layer 3 but also covers the inside edges 8 of electrodes 6 as shown in FIG. 5.

The resistance value possessed by the entire resistor sheet is the parallel composite sum of the resistance value resulting from main resistor layer 3 and protective resistor layer 7. The composite sum is greatly influenced by the resistance value offered by the main resistor layer 3. As long as the sheet resistivity of main resistor layer 3 is uniform, any lack of uniformity in the sheet resistivity of protective resistor layer 7 negligibly affects the parallel composite sum. At the points of coordinates of input, the corresponding resistance value of protective resistor layer 7 are serially added up. However, these increments in the resistance value can be practically ignored because the thickness of protective resistor layer 7 is so small as to fall in the neighborhood of, for example, 10 $\mu$m, and the area of the layer which is involved in the conduction of electricity during the input into the input tablet is, for example, 1 mm² which is large when compared to the thickness of the layer.

Figure 6:
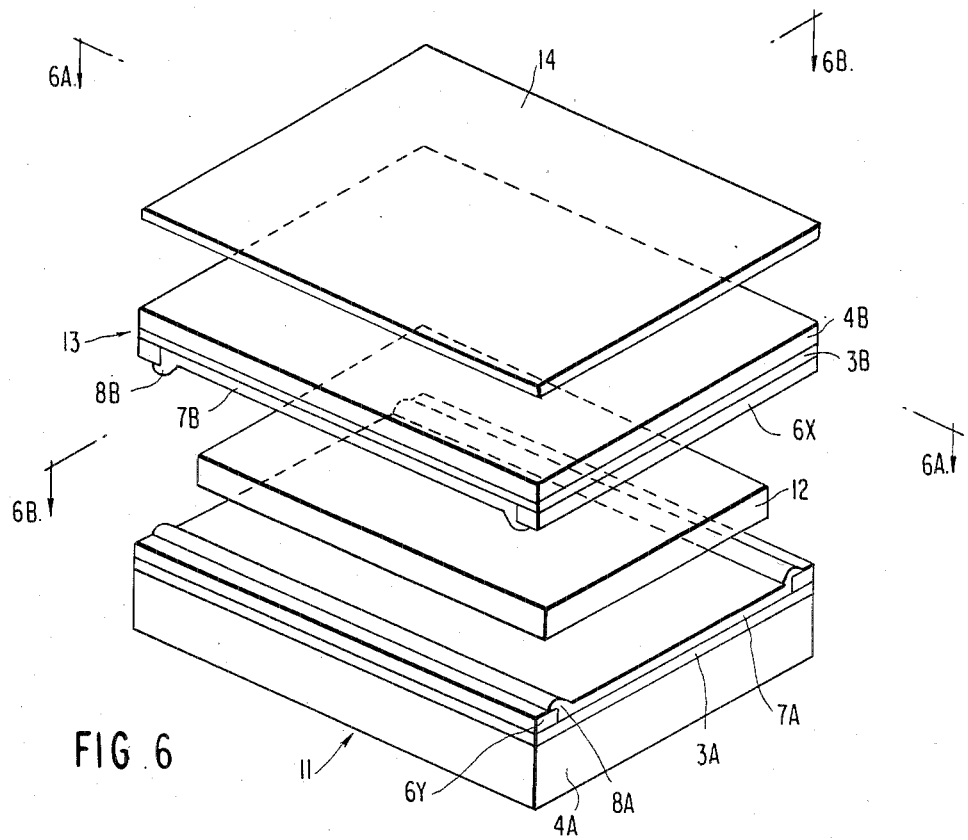
FIG. 6 is a perspective exploded view of a preferred embodiment of the invention.
Figure 6A:
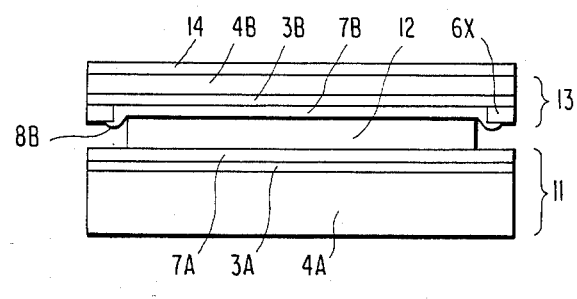
FIG. 6A shows a cross-sectional view of the input tablet according to the example of the present invention in the direction as shown in FIG. 6.
Figure 6B:
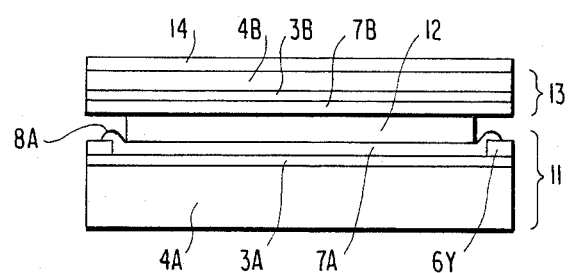
FIG. 6B shows another cross-sectional view of the input tablet according to the example of the present invention in the direction as shown in FIG. 6.

FIG. 6 is a perspective exploded view of the resistor sheet input tablets of the present invention. FIG. 6A shows a cross-sectional view of the input tablet according to the example of the present invention in the direction as shown in FIG. 6. FIG. 6B shows another cross-sectional view of the input tablet according to the example of the present invention in the direction as shown in FIG. 6. Lower resistor sheet 11 having rigid substrate 4A as the insulating layer thereof is disposed such that the rigid substrate 4A is on the underside of the lower resistor sheet. Insolating layer 4A has provided thereon main resistor layer 3A upon which protective resistor layer 7A is provided. 8A is the inside edge of electrode 6Y. On lower resistor sheet 11 and through the intervention of elastic pressure-sensitive conductive sheet 12, upper resistor sheet 13 is superposed using flexible sheet 4B as the insulating layer thereof and is disposed such that flexible sheet 4B will be on the upside of the upper resistor sheet. Insolating layer 4B has provided thereon main resistor layer 3B upon which is provided protective layer 7B. 8B is the inside edge of electrode 6X. The relative position of the two resistor sheets thus superposed is such that electrodes 6Y lie perpendicularly to electrodes 6X. On upper resistor sheet 13, insulating protective sheet 14 is deposited. All of these sheets are then intimately bonded so as to form one complete sheet. The resulting resistor sheet input tablet is used in the same conventional manner as any other input tablet.

Since the main resistor layer is made of a thin metal film, the resistor sheet input tablet has a uniform distribution of a fixed sheet resistivity which thus ensures high quality reproduction of image signals. More specifically, by the process of the present invention, which comprises forming a thin metal film on a copper foil by electroplating and subsequently etching out the copper foil, the sheet resistivity of the main resistor layer produced is highly uniform because of the very smoothness of the copper foil surface and the uniformity in thickness of the thin metal film by electroplating.

Furthermore, since the surface of the main resistor layer is covered with the protective resistor layer, the main resistor layer can have a very small thickness of about 0.01 to 0.7 $\mu$m. Thus, even if the main resistor layer is made of a material which is not resistant to wear, quality can be stably maintained for long periods of time.

The following example is illustrative of the present invention and is in no way intended to limit the scope thereof.

EXAMPLE

One side of a copper foil, 35 $\mu$m thick and having an area of 35 cm×35 cm, was covered with a masking adhesive sheet (a product of Nitto Electric Industry Co., Ltd., marketed under the trademark "SPV No. 224"). The copper foil thus coated was immersed in a defatting liquid and a 20% hydrochloric acid solution and then washed with water. On the other side of the copper foil, a thin-nickel alloy (comprising about 70% by weight of tin and the balance nickel to make up 100% by weight) layer was formed having a thickness of about 0.05 $\mu$m by electroplating. Two such three-layer composites were prepared for use as an upper and a lower resistor sheet for a resistor sheet input tablet.

To produce the upper resistor sheet, the adhesive sheet was peeled off the copper foil in one of the two three-layer composites prepared above. An epoxy type adhesive agent was spread on the surface having the tin-nickel alloy layer deposited thereon and a polyester film about 50 $\mu$m (2 mils) thick was superposed thereon and bonded thereto using heat and pressure. Edges, each 2.5 cm wide, were cut from the four sides of the resulting composite film to provide a sheet having an area of 30 cm×30 cm. Two opposite edge portions, 10 mm wide, of this square sheet were covered with masking tape. Copper was etched out from the exposed surface of the square sheet with an ammoniacal copper-etching liquid (a product of Yamatoya Ltd., marketed under the trademark "Alka-H SSR"). Then, the sheet was washed with water and dried. Next, the masking tape was removed from the opposite edge portions. As a result, an upper resistor sheet having at the opposite edges thereof, copper electrodes 10 mm wide, was obtained.

The above resistor sheet showed a sheet resistivity averaging 500 ohms per square. The variation of the sheet resistivity in the entire area was within ±3%.

On the surface of the resistor layer, carbon paste (a product of Mitsui-Toatsu Corp., marketed under the trademarjk "MCP-7002") was applied by screen printing using a 200 mesh polyester screen and allowed to cure. After the applied paste had cured, the sheet was tested for sheet resistivitiy with a four-needle resistance tester. The sheet resistivity was found to average 480 ohms per square and the variation of sheet resistivity was within ±5%.

In order to produce a lower resistor sheet from the remaining three-layer component, the adhesive sheet was peeled off the copper foil. Glass cloth impregnated with epoxy resin (conventionally known as a "prepreg") was superposed and bonded using heat and pressure without the aid of any adhesive agent on the surface on which the tin-nickel alloy layer had been deposited. All four edge portions, each 2.5 cm wide, were cut off from the rigid resistor sheet thus obtained. As described above, copper was etched out of the square sheet except for two opposite edge portions, each 10 mm wide. The same carbon paste as described above was spread on the exposed resistor layer and allowed to cure. In this manner the protective resistor layer was produced.

A resistor sheet input tablet was formed by using the upper and lower resistor sheets obtained as described above. This resistor sheet input tablet could reproduce a given picture image with high resolution and little distortion even in the peripheral region. Further, this resistor sheet input tablet was found to be more than 10 times more durable than a similar resistor sheet input tablet that lacked the protective resistor layer.

While this invention has been described in detail and with reference to specific embodiments thereof, it would be apparent to one skilled in the art that various changes and modifications can be made therein wihout departing from the spirit and scope thereof.

What is claimed is:

1. A method for the production of a resistor sheet for an input tablet comprising:
   (1) depositing a thin metal film as a main resistor layer on one side of a highly electrically conductive plate,
   (2) bonding an electrically insulating layer to the surface of said thin metal film, (3) masking the opposite edges of said highly electrically conductive plate which are reserved for the subsequent formation of electrodes thereon, (4) simultaneously etching out said highly electrically conductive plate, thereby exposing said thin metal film, and forming electrodes of the resistor sheet at said masked edges, and (5) coating the exposed surface of said metal film on the resistor sheet with a protective resistor layer.

2. A method according to claim 1, wherein said highly electrically conductive plate comprises a material selected from the group consisting of copper, aluminum and nickel.

3. A method according to claim 1, wherein said main resistor layer comprises a thin metal film having a thickness of 0.01 to 0.7 $\mu$m and a sheet resistivity of 5 to 5,000 ohms per square.

4. A method according to claim 1, wherein said main resistor layer comprises a thin metal film formed by electroplating.

5. A method according to claim 1, wherein said protective resistor layer has a thickness of 5 to 30 $\mu$m, a sheet resistivity of 50 to 50,000 ohms per square and comprises a mixture of (a) carbon powder or metal powder and (b) a synthetic resin.

* * * * *